(12) United States Patent
Weiss et al.

(10) Patent No.: US 7,864,947 B2
(45) Date of Patent: Jan. 4, 2011

(54) CALL NOTIFICATION SYSTEM, METHOD, COMPUTER PROGRAM AND ADVERTISING METHOD

(75) Inventors: Tom Weiss, Harrow (GB); Matthew Karas, London (GB); Jonathan Ellis, Wirral (GB); Simon Waterfall, London (GB); Toby Russell Constantine, London (GB)

(73) Assignee: Psygnificant Services Limited, London (GB)

( * ) Notice: Subject to any disclaimer, the term of this patent is extended or adjusted under 35 U.S.C. 154(b) by 291 days.

(21) Appl. No.: 11/351,250

(22) Filed: Feb. 8, 2006

(65) Prior Publication Data

US 2006/0262924 A1 Nov. 23, 2006

Related U.S. Application Data

(60) Provisional application No. 60/594,059, filed on Mar. 8, 2005.

(30) Foreign Application Priority Data

Feb. 8, 2005 (GB) .................................. 0502581.2
Dec. 12, 2005 (GB) .................................. 0525249.9

(51) Int. Cl.
*H04M 1/00* (2006.01)

(52) U.S. Cl. ............... 379/373.01; 379/93.35; 379/374.03; 455/567

(58) Field of Classification Search ............ 379/142.01, 379/142.04, 142.06, 142.08, 93.01, 373.01, 379/93.35, 374.03–376.01; 370/352; 455/412.2, 455/567, 415
See application file for complete search history.

(56) References Cited

U.S. PATENT DOCUMENTS 5,513,251 A * 4/1996 Rochkind et al. ........ 379/93.35
5,805,673 A * 9/1998 Underwood et al. ..... 379/93.01

(Continued)

FOREIGN PATENT DOCUMENTS

EP 0802661 10/1997

(Continued)

OTHER PUBLICATIONS

Patent Act 1977: Search Report under Section 17 for Great Britain Application No. 0602544.9 dated May 16, 2006.

(Continued)

*Primary Examiner*—MD S Elahee
(74) *Attorney, Agent, or Firm*—Leason Ellis LLP

(57) ABSTRACT

A call notification system method, computer program and advertising method are disclosed. A call notification is generated at a recipient system (2) in response to receipt of initiation data on a call from an originating system (3). At least aspects of the call notification are controllable by the originating system (3).

25 Claims, 14 Drawing Sheets

U.S. PATENT DOCUMENTS

| | | | |
|---|---|---|---|
| 5,907,604 A | 5/1999 | Hsu | |
| 6,138,008 A | 10/2000 | Dunn et al. | |
| 6,687,242 B1 | 2/2004 | Enzmann et al. | |
| 6,826,270 B1 | 11/2004 | Welch et al. | |
| 6,922,721 B1 | 7/2005 | Minborg et al. | |
| 6,977,909 B2 | 12/2005 | Minborg | |
| 6,996,072 B1 | 2/2006 | Minborg | |
| 7,164,913 B1 | 1/2007 | Dantu et al. | |
| 7,512,692 B2 | 3/2009 | Minborg et al. | |
| 2001/0053219 A1 | 12/2001 | Krank et al. | |
| 2002/0067812 A1 | 6/2002 | Fellingham et al. | |
| 2003/0032414 A1 | 2/2003 | Melaku et al. | |
| 2003/0133553 A1 | 7/2003 | Khakoo et al. | |
| 2004/0137923 A1 | 7/2004 | Lang | |
| 2004/0223605 A1 | 11/2004 | Donnelly | |
| 2005/0287997 A1* | 12/2005 | Fournier | 455/415 |
| 2006/0105766 A1 | 5/2006 | Azada et al. | |
| 2006/0183463 A1 | 8/2006 | Falk et al. | |
| 2008/0299949 A1* | 12/2008 | Higuchi et al. | 455/412.2 |

FOREIGN PATENT DOCUMENTS

| | | |
|---|---|---|
| EP | 1263197 | 10/1997 |
| EP | 1024643 | 8/2000 |
| JP | 2001-197157 | 7/2001 |
| JP | 2003-046664 | 2/2003 |
| JP | 2003298680 | 10/2003 |
| JP | 2004 064407 | 2/2004 |
| WO | WO 99/29135 | 6/1999 |
| WO | WO 03/034755 | 4/2003 |
| WO | WO-03/061244 | 7/2003 |
| WO | WO-2003/063452 | 7/2003 |
| WO | WO 2004/057886 | 7/2004 |
| WO | WO 2005/046189 | 5/2005 |
| WO | WO-2005/050954 | 6/2005 |
| WO | WO-2006/011902 | 2/2006 |
| WO | WO 2008/095084 | 8/2008 |
| WO | WO 2008/106431 | 9/2008 |

OTHER PUBLICATIONS

International Search Report for international Application No. PCT/GB2006/000440, dated May 22, 2006.

EPO Examination Report, dated Nov. 29, 2007.

Notification of Reasons for Refusal of the Japanese Patent Office, dated May 20, 2008, for Patent Application No. JP 2007-553712 (4 sheets; translation only).

* cited by examiner

| FIG. 1A |
|---|
| Legend |
| 2 recipient system |
| 3 originating system |
| 4 network |

| FIG. 3A |
|---|
| Legend |
| 1 server |
| 2 recipient system |
| 3 originating system |
| 4 network |

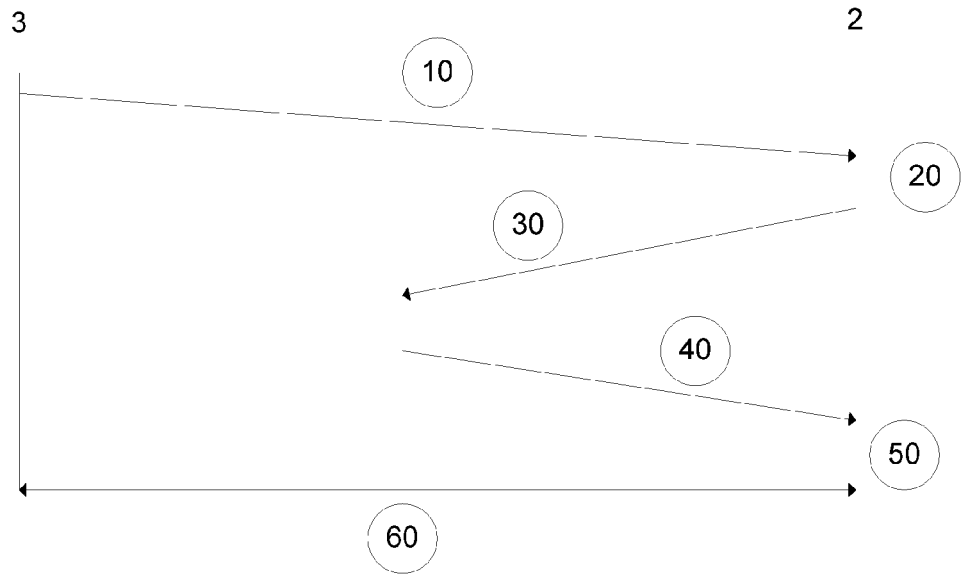

Fig. 2

| FIG. 2A |
|---|
| Legend |
| 10 - initiation request by the originating system 3 to the recipient system 2 |
| 20 - check whether originator generated call notification is supported and enabled |
| 30 - generate the call notification |
| 40 – data obtained by the recipient system 2 |
| 50 - call notification generated and output by the recipient system 2 |
| 60 - communication phase starts after recipient system accepts call |

| FIG. 4A |
|---|
| Legend |
| 110 – standard initiation phase |
| 140 - "extended initiation phase" |
| 120 - communication phase commences |
| 100 - initiation handshake |
| 105 – initiation handshake ends |
| 130 - call notification data sent from the originating system 3 to the recipient system 2 |

| FIG. 5A |
|---|
| Legend |
| 100 - initiation handshake |
| 105 – initiation handshake ends |
| 110 – standard initiation phase |
| 120 - communication phase commences |
| 200 – separate communications session |
| 205 – recipient system 2 requests transfer of call notification data |
| 210 - call notification data transmitted by originating system 3 |

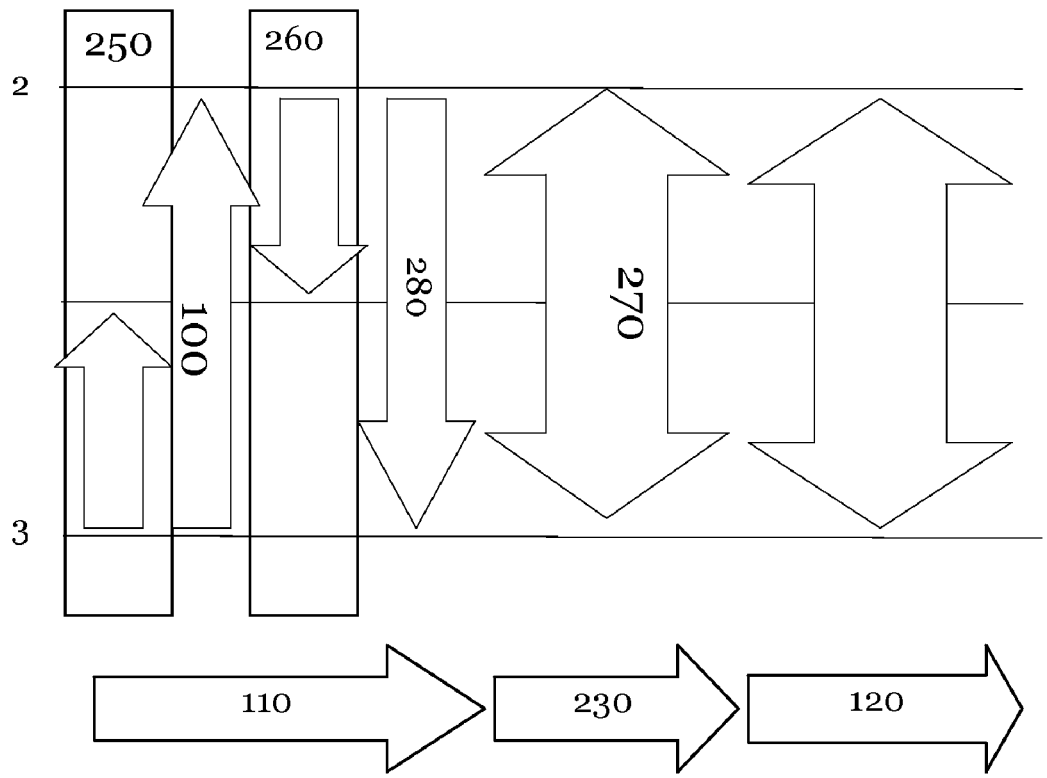

Fig. 6

| FIG. 6A |
|---|
| Legend |
| 100 - initiation handshake |
| 110 – standard initiation phase |
| 120 - communication phase commences after step 280 |
| 250 – separate communications session by originating system 3 |
| 260 - further separate communications session by recipient system to check with the server 1 whether call notification data is available |
| 270 - recipient system 2 closes the initiating handshake and opens a communications session |
| 280 - call notification data is transferred from the originating system 3 to the recipient system 2 |

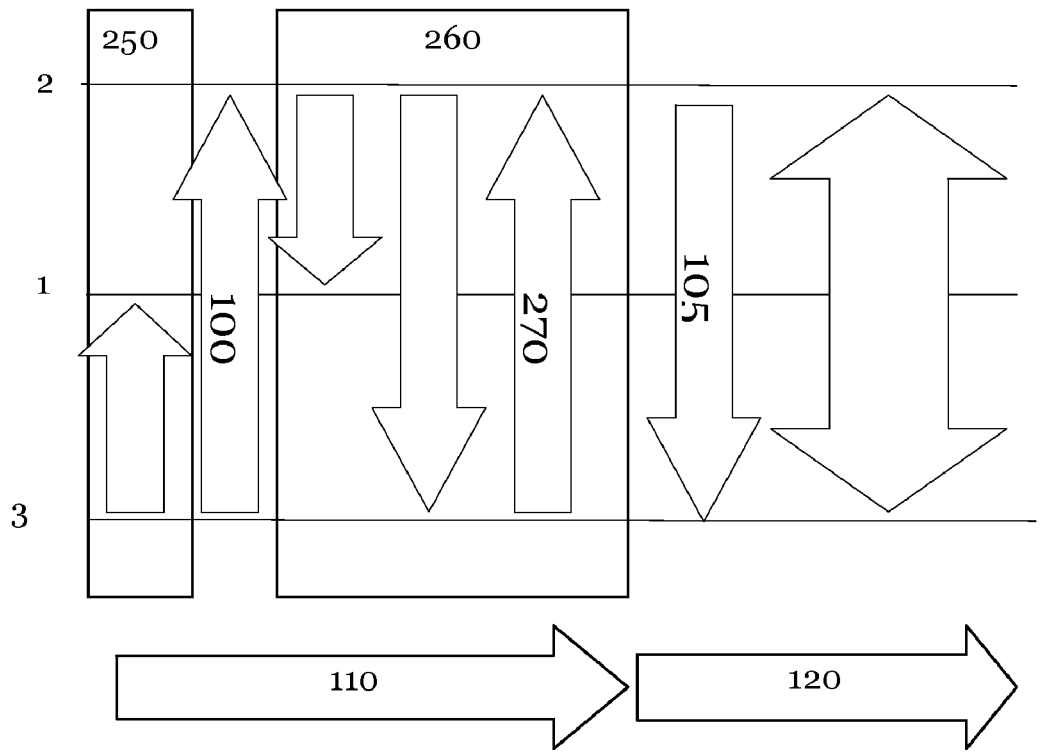

Fig. 7

| FIG. 7A |
|---|
| Legend |
| 100 - initiation handshake |
| 105 –initiation handshake ends |
| 110 – standard initiation phase |
| 120 - communication phase commences |
| 250 – separate communications session by originating system 3 |
| 260 - further separate communications session by recipient system to check with the server 1 whether call notification data is available |
| 270 – recipient system 2 closes the initiating handshake and opens a communications session |

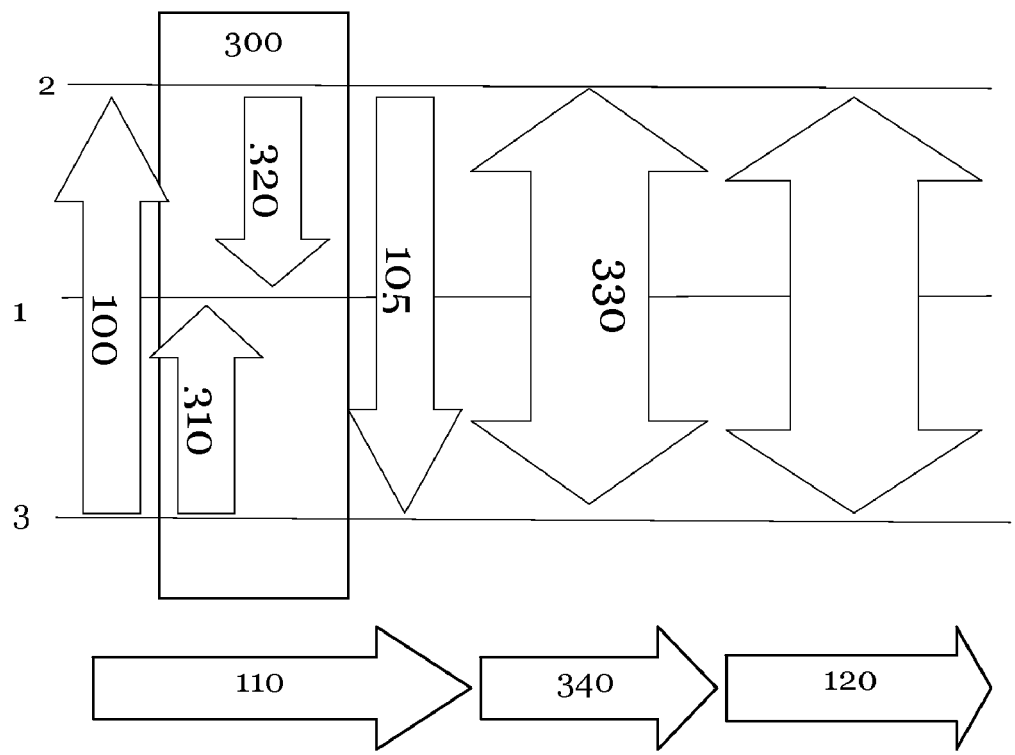

Fig. 8

| FIG. 8A |
|---|
| Legend |
| 100 - initiation handshake |
| 105 – initiation handshake ends |
| 110 – standard initiation phase |
| 120 - communication phase commences |
| 300 – originating system 3 opens a separate communication session |
| 310 – register that call notification data is available on separate server 1 |
| 320 – check whether call notification data is available |
| 330 – open communications session with the originating system 3 but do not allow communication phase to start |
| 340 - extended initiation phase in which call notification data is transferred from originating system 3 to recipient system 2 |

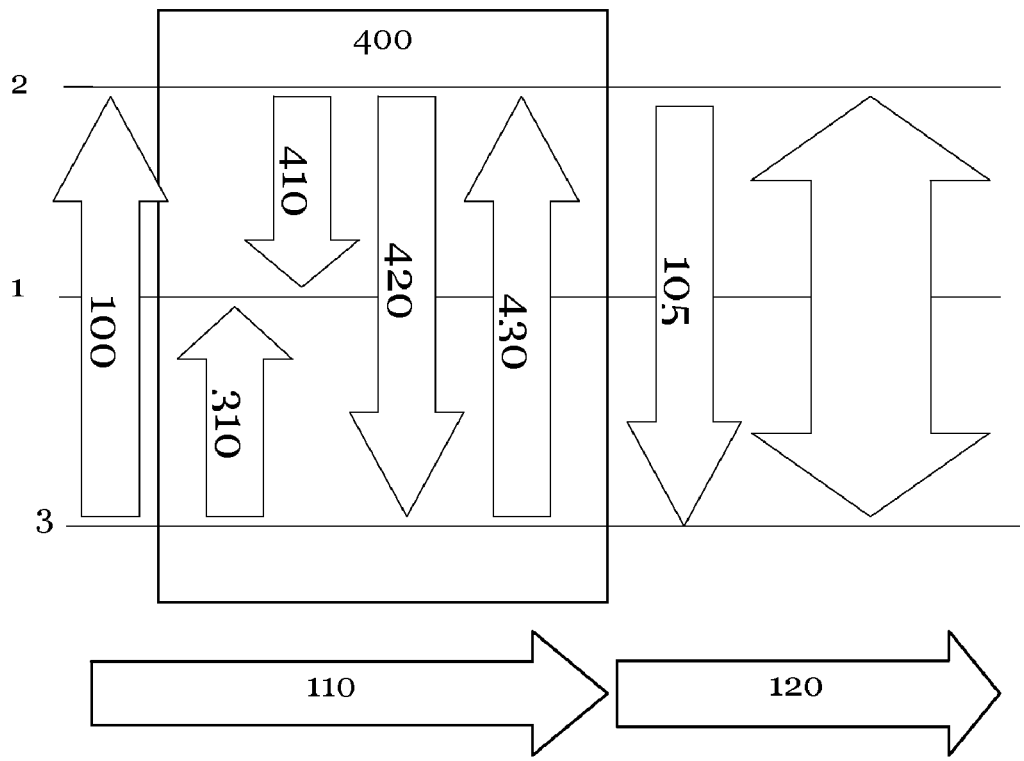

Fig. 9

| FIG. 9A |
|---|
| Legend |
| 100 - initiation handshake |
| 105 – initiation handshake ends |
| 110 – standard initiation phase |
| 120 - communication phase commences |
| 400 – originating system 3 opens a separate communication session |
| 310 – register that call notification data is available on separate server 1 |
| 410 - recipient system 2 opens a separate communication session and checks whether call notification data is available |
| 420 – recipient system 2 uses the current session to request call notification data from originating system 3 |
| 430 – originating system 3 transmits call notification data to recipient |

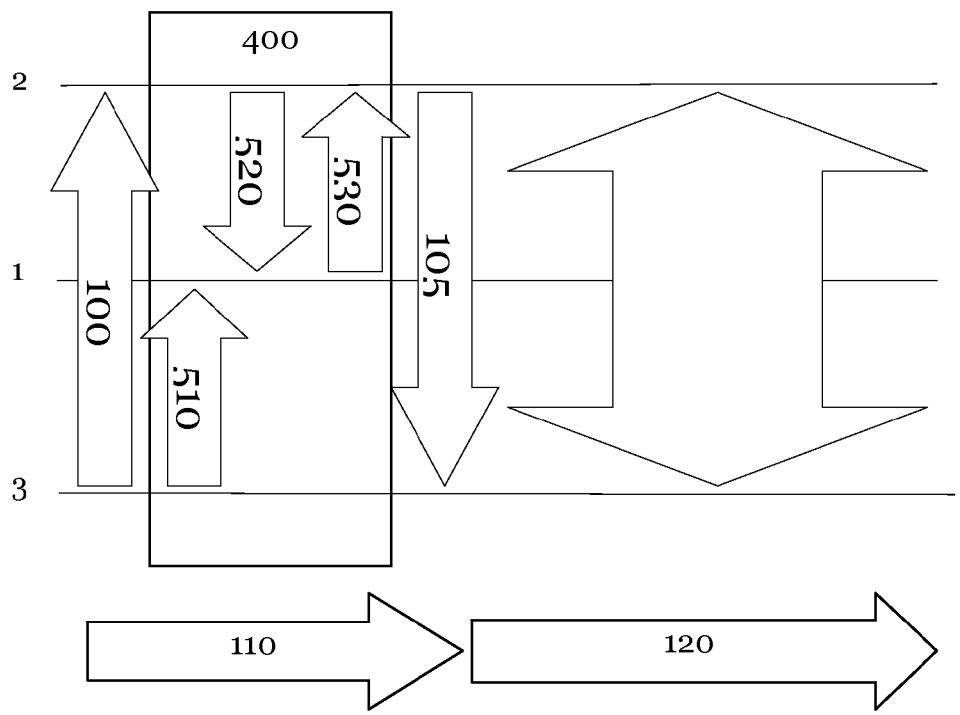

Fig. 10

| FIG. 10A |
|---|
| Legend |
| 100 - initiation handshake |
| 105 – initiation handshake ends |
| 110 – standard initiation phase |
| 120 - communication phase commences |
| 400 – originating system 3 opens a separate communication session |
| 510 – originating system 3 uploads call notification data to separate server 1 |
| 520 – recipient system requests appropriate call notification data from server 1 |
| 530 – call notification data downloaded from server 1 to recipient system 2 and outputted |

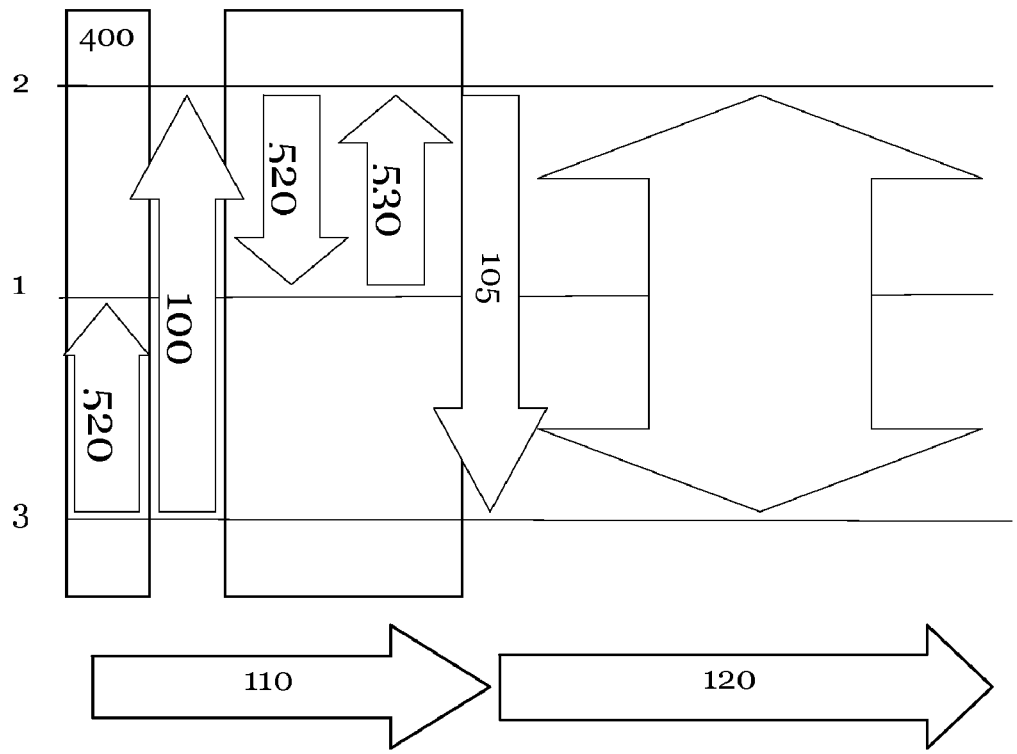

Fig. 11

| FIG. 11A |
|---|
| Legend |
| 100 - initiation handshake |
| 105 – initiation handshake ends |
| 110 – standard initiation phase |
| 120 - communication phase commences |
| 400 – originating system 3 opens a separate communication session |
| 510 – originating system 3 uploads call notification data to separate server 1 before the session initiation handshake 100 |
| 520 – recipient system requests appropriate call notification data from server 1 |
| 530 – call notification data downloaded from server 1 to recipient system 2 and outputted |

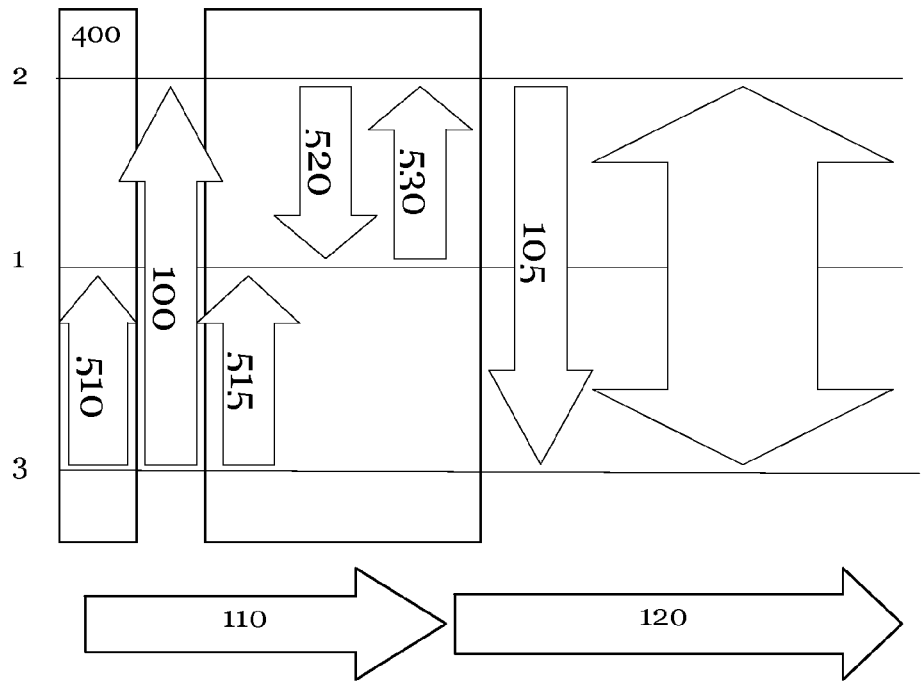

Fig. 12

| FIG. 12A |
|---|
| Legend |
| 100 - initiation handshake |
| 105 – initiation handshake ends |
| 110 – standard initiation phase |
| 120 - communication phase commences |
| 400 – originating system 3 opens a separate communication session |
| 510 – originating system 3 uploads call notification data to separate server 1 before the session initiation handshake 100 |
| 515 - originating system 3 notifies the server 1 of the call notification data to be used |
| 520 – recipient system requests appropriate call notification data from server 1 |
| 530 – call notification data downloaded from server 1 to recipient system 2 and outputted |

FIG. 13A

Legend

| |
|---|
| 2 recipient systems |
| 1000 call centre |
| 1010 operator terminals |
| 1020 centre manager terminal |
| 1030 notification server |
| 1040 data network |
| 1050 database holding data on recipient systems 2 |

FIG. 14A

Legend

| |
|---|
| 2 recipient systems |
| 1200 search engine for searching a database of subscribed suppliers for matches with keywords |
| 1210 notifications output as a slide-show of advertisements |
| 1220 keys on recipient system 2 for navigating advertisements in slide-show |
| 1230 supplier (upon selection of an advertisement, user presses a call key on recipient system 2 to trigger a call or a call-back request with a respective supplier) |

CALL NOTIFICATION SYSTEM, METHOD, COMPUTER PROGRAM AND ADVERTISING METHOD

FIELD OF THE INVENTION

The present invention relates to a call notification system, method, computer program and advertising method that is particularly applicable to customisation of call notification in mobile telephones, computer based communication systems and the like.

BACKGROUND TO THE INVENTION

Numerous different mechanisms are used in today's lives for communication. A communication made using one of these mechanisms is referred to herein as a call. Mechanisms used include standard telephone calls mobile and fixed line, internet or network based calls typically using voice over Internet Protocol, VoIP, video-phone calls, chat sessions text based or otherwise, and application-sharing sessions when an application on a single machine can be controlled by two users, one of whom is on a remote machines. You can see it in action using MSN Messenger and other similar packages.

All of the mechanisms have at least three phases that occur in sequence:
Initiation phase;
Communication phase; and,
Termination phase.

Whilst the initiation and termination phases will include transmission of data that could be considered "communication", the communication phase referred to in this document is intended to refer to the (typically synchronous) interaction between users once a call has been initiated by one party and accepted by another.

The termination phase includes resource recovery, billing and the like. This phase is not particularly relevant to the present invention and therefore is not described further.

The initiation phase is triggered by a party requesting the call (referred to hereafter as the "originator") and accepted by at least one other party (referred to hereafter as a "recipient"). Typically, once the originator requests his or her system to initiate a call, a connection is established with the recipient's system via data communication referred to as a "handshake". Handshakes are typically transparent to the originator and recipient and dealt with by the underlying communication mechanisms. During the handshake, the originator's and recipient's systems and any necessary intermediate systems exchange data necessary for the communication phase to start. In connection-oriented communications, the handshake stage may also include negotiation of necessary facilities such as bandwidth with intermediate systems to support and route data during the communication phase.

When the recipient's system receives a handshake, an appropriate notification is typically provided to alert the recipient of the requested call. The recipient accepts the call in the manner appropriate to the communication system (picking up the phone, pressing a button, accepting a prompt from a user interface etc.). The manner of notification typically depends on the nature and facilities of the recipient's system and any customisation or personalisation that has been applied. For example, the recipient's system may pick a particular ring tone to be played when a call is received, an icon to be displayed, an action to be performed such as vibrate in mobile telephones or some combination thereof.

The initiation phase of standard fixed line voice calls, made over PSTN or ISDN systems, involves the sending of a call-setup packet of data usually referred to as the Calling Line Identifier CLI, although it contains more information than just the telephone number of the originating system, to the recipient's system. During the transmission of the CLI, switches within the telephone network are configured to establish an end-to-end connection. There are variations to the format of the call-setup data on different systems, although these are largely interoperable.

Mobile telephone networks, such as those based on GSM, CDMA or UMTS systems, use the same CLI formats as fixed lines. However, due to the technology needed to establish a wireless connection, mobile telephones tend to be much more sophisticated than fixed line telephones. One use of mobile telephone is to enable a recipient to associate a particular notification type with one or more originator's CLI, for example so that a call from one originator is notified with a different ring tone to that of another originator.

VoIP systems are very varied in the way in which they are implemented, but the usual approach has an initiation phase in which the originating and recipient systems exchange a small amount of data in a format defined by a set of rules, often using the standardised Session Initiation Protocol SIP.

IP technology allows text-based chat, video-calls and the use of shared graphical environments. With respect to session initiation, these are all implemented in the same way as VoIP.

STATEMENT OF INVENTION

According to an aspect of the present invention, there is provided a call notification system arranged to generate a call notification at a recipient system in response to receipt of initiation data on a call from an originating system, wherein at least aspects of the call notification are controllable by the originating system.

The originating and recipient system may each be one of:
a mobile telephone, an application running on a computer, an IP telephony client, a fixed line telephone, a video phone, or a teleconferencing system.

The initiation data may be arranged to trigger the recipient system to obtain call notification data for using in generating the call notification.

The recipient system may be arranged to open a separate connection to the originating system to obtain the call notification data from the originating system.

The system may further comprise a remote repository arranged to store call notification data associated with the originating system, at least one of the recipient system and the originating system being arranged to obtain call notification data associated with the originating system from the remote repository for generating the call notification data.

The remote repository may further comprise a user interface operative to accept call notification data and/or selections from a user of an originating system and store the call notification data and/or selections associated with the originating system.

The originating system may be arranged to provide call notification data to the remote repository for each call initiated.

The initiation data may include one or more of: call notification data, encoded call notification data, a link to call notification data or a unique identifier referencing call data stored at a predetermined location, the recipient system being arranged to generate the call notification in dependence on the call notification data.

The call notification data may include one or more of:
a ringtone, a link to call notification data, a definition of the call notification to be generated at the recipient system, an image contact data, instructions on an action to be taken by the recipient system, a reference to a source from which data must be obtained, instructions on how to generate at least aspects of the call notification, or data requiring encoding, decoding, translating or rendering by the recipient system prior to output.

The recipient system may be arranged to store at least aspects of the call notification on demand.

According to another aspect of the present invention, there is provided a method of generating call notifications comprising:

receiving of initiation data on a call from an originating system at a recipient system; and, generating a call notification at the recipient system, wherein at least aspects of the call notification are predetermined by the originating system.

The method may further comprise obtaining call notification data at the recipient system for use in generating the call notification.

The method may further comprising opening a separate connection from the recipient system to the originating system and obtaining the call notification data from the originating system.

The method may further comprise: storing call notification data in a remote repository; and, at least one of the recipient system and the originating system obtaining the call notification data associated with the originating system from the remote repository.

The method may further comprise providing call notification data to the remote repository from the originating system for each call initiated.

The method may further comprise storing at least aspects of the call notification on demand at the recipient system.

According to another aspect of the present invention, there is provided a computer program carrier encoding computer program code for: generating a call notification at a recipient system in response to receipt of initiation data on a call from an originating system, wherein at least aspects of the call notification are controllable by the originating system.

According to another aspect of the present invention, there is provided a method of advertising goods or services comprising:

generating a call notification at a recipient system in response to receipt of initiation data on a call from an originating system, wherein at least aspects of the call notification advertise the goods or services; and, connecting a call from a representative of the goods or services to the recipient system in the event of acceptance of the call notification at the recipient system.

Embodiments of the present invention may be implemented in software, firmware, hardware or some combination thereof. Embodiments may be pre-installed and/or integrated into systems or may be available as installable ad-ons.

Selected embodiments of the present invention are directed to a communication notification system in which the notification and other data associated with an incoming communication is customisable by the party initiating that communication.

Using an embodiment of the present invention, a person receiving a call during a busy meeting can be provided additional means (such as an urgent flag, ring tone or over-riding of silent mode) telling whether a call is of an urgent nature. Embodiments of the present invention preferably permit users to store and update profile data via a user interface over the world wide web, a mobile phone network or any other communications system. Profile data may be used as call notification data and may include:

A ringtone (or a link to/definition of a ringtone)
An image associated with the user
User address/contact data
An action to be taken by the receiving hardware (for example, a PC may be instructed to run a particular program)

For example, the call notification data may be:
appended to, or encoded within, the header or body of handshake or call setup data;
accessible via a link in the header or body of the handshake/call setup data;
associated with a unique ID in the header or body of the handshake/call setup data that a compatible receiver knows how to use to obtain the call notification data.

Irrespective of the communication type, a user application at the recipient system (that may be software, hardware, firmware or some combination thereof) interprets the supplied and/or obtained call notification data to display or action it. In addition, the recipient system may be arranged to connect to the originating system or to a remote data source to obtain further data, for example, to grab/update address information.

Notification style and content are independent of any pre-configured at the recipient system so the originator (sender) can truly personalise his or her communications. Many benefits can arise from this, for example:

companies can enforce their brand/style by having a specific ringtone and graphic displayed whenever a call or email is received;

users of mobile phones can update their address books with enriched data, with an option to keep it updated automatically;

an urgency flag could enable the recipient of a mobile phone call to see whether the incoming call really needed answering, or it was just someone calling for a chat the notification data on a mobile phone system could display a summary of the intended topic of the call.

As use of bandwidth has a cost, systems typically exchange no more data in the initiation phase than is essential to establish the call and start the communication phase. The possibility for user-defined data to be sent at this stage is limited to identification of the originator or a small text-only field.

Embodiments of the present invention allow the originator to define attributes of the notification of a call that is to be provided to a recipient. During the initialisation of a call the recipient system is provided with, or is triggered to obtain, data and generates a notification in dependence on the data and the attributes defined by the originator.

Examples of aspects of notifications that could be defined include ring-tones, personal contact information and photographic images.

Embodiments of the present invention allow any form of data to be sent by the originator and used as part of the call notification before the communication phase starts.

For simplicity, the majority of this document refers to two-party communications, although it will be appreciated that the principles and examples described could also be applied to multi-party communications.

In preferred embodiments of the present invention, call notification data is obtained during the initiation phase to define aspects of the notification to be produced to the recipient. Data received by the recipient's system during the initiation phase may be a trigger to cause the recipient's system to obtain the call notification data from the originator's system or some other intermediary.

A second communication channel may be opened during the initiation phase for the recipient system to access the call notification data, the initiation phase being extended to delay notification until the call notification data is received.

This allows the data to be used for notification, for instance replacing a ring-tone with an audio alert provided by the originator, or displaying an image of the originator, or one specifically relevant to the call.

Because the embodiments of the present invention enable significant communication to be performed within the call notification mechanism, in selected embodiments it is possible to use call notification to communicate without the notification resulting in a call.

BRIEF DESCRIPTION OF THE DRAWINGS

Examples of the present invention will now be described with reference to the accompanying drawings, in which:

FIG. 2 is a diagram illustrating the flow of data in embodiments of the present invention;

FIGS. 4 to 12 are diagrams illustrating aspects of the flow of data in embodiments of the present invention; and, FIGS. 13 and 14 illustrate applications using embodiments of the present invention.

DETAILED DESCRIPTION

Figure 1:
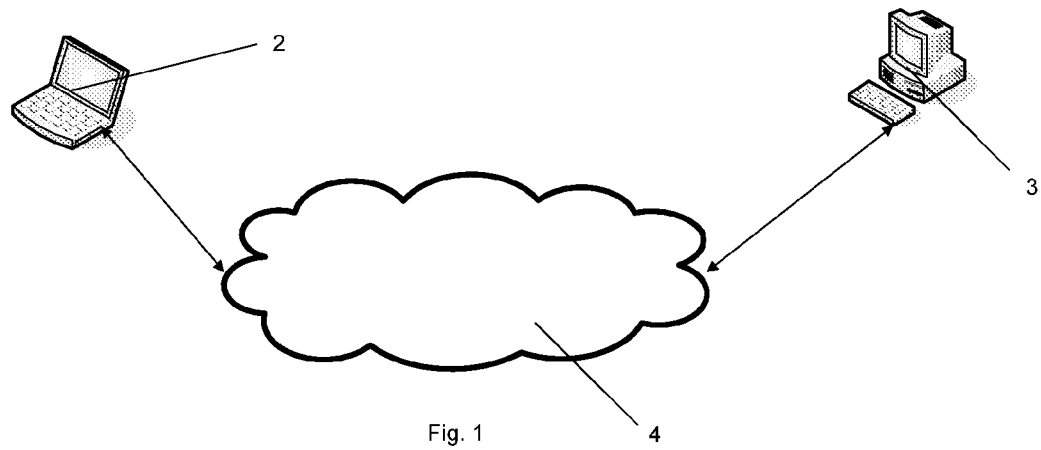
FIG. 1 is a schematic diagram of a communications system incorporating an embodiment of the present invention.

FIG. 1 is a schematic diagram of a communications system incorporating an embodiment of the present invention.

The communication system includes an originating system 3, a recipient system 2 interconnected by a network 4.

Typically, the originating system 3 triggers an initiation phase of a call by issuing a request to the network 4 for a connection to the recipient system 2.

The network establishes identity data on the recipient system 2 based on identifying information provided by the originating system 3. The identity data may include location, identity and/or other necessary information of the recipient system 2. In the case of mobile telephony this identity data includes the MSIDN, commonly known as a telephone number. For instant messaging or other services this may be a more general IP address and/or "user id".

Once the network 4 has established the identity data for the recipient system 2, it sends session initiation data to the recipient system 2. The session initiation data includes technical details of the communication session such as codec information for a video or audio call, or code pages for text communications.

At some point during the initiation phase (or at its completion), a call notification is generated at the recipient system 2. Various different embodiments of the present invention are discussed below in more detail but the common element is that at least attributes of the call notification generated at the recipient system 2 are controllable by the originator.

In selected embodiments, the recipient system is triggered to obtain call notification data for use in generating the call notification. Alternatively, or in addition, call notification data may be provided to the recipient system 2 directly or indirectly. In one embodiment, the call notification data may be appended to, or encoded within, the calling line identifier.

It will be appreciated that this is different to prior systems such as those described above in which the originator has no control over the attributes of a call notification generated at a recipient system 2—such attributes are controlled by the recipient.

The initiation phase is not normally considered successfully complete until the user of the recipient system 2 agrees to accept the call, at which point the communication phase starts. However, in selected embodiments of the present invention, the initiation phase may be considered complete at an earlier stage. In such embodiments, a notification phase is introduced between the initiation phase and communication phase so that once the initiation phase is complete, the notification phase starts and the communication phase only starts once the notification phase has been completed and the call accepted.

The call notification may be generated using resources that already exist on the recipient system 2 (such as selecting a specific existing ring tone or playing a custom ring tone using a ring tone generator on the recipient system 2).

In embodiments of the present invention, the originating system 3 introduces data to the recipient system 2, either directly or indirectly, that is used to generate a custom call notification, be that a special ring-tone, video image, or the display of a short message, on the recipient system 2.

It will be appreciated that the originating system and the recipient system need not be of the same type. Embodiments of the present invention are applicable as long as the underlying communications mechanism used is compatible with both systems. For example, a mobile telephone will be able to trigger an originator controlled call notification on a fixed line telephone. a mobile telephone may also be able to trigger an originator controlled call notification on a VOIP client on a computer. In this situation, the mobile telephone call may be treated as a standard phone call and handled by a VOIP gateway between the mobile telephone network and VOIP network. Alternatively, if the phone can support VOIP natively then no gateway would be needed. If a call is passed through a gateway the preferably the gateway includes facilities enabling the originator controlled call notification data within the initiation data to be translated into whatever format the recipient system requires.

The call notification data need not be self contained (or ready for output) and may include:
references to other sources from which data must be obtained;
instructions on how to produce a call notification (using resources on the recipient system or obtained elsewhere); and,
data that requires encoding, rendering or the like by the recipient system prior to output.

In premium versions of the described embodiments, the originating system may be given the option to send a communication notification using one of the mechanisms described herein without progressing into the communication phase.

In other embodiments, the call notification may not initially be associated with a single originator but may instead be associated with a number or call centre to be connected to if a user at the recipient system accepts the call notification. In this way, enriched advertising call notifications can be sent out querying user interest. Only if a user accepts the call notification does the call become connected to an originator system. As such there does not need to be the 1:1 mapping of originator:recipient as in most standard calls and an originator can potentially query multiple recipients at once, connecting only to those that positively accept the call notification.

FIG. 2 is a diagram illustrating the flow of data in embodiments of the present invention.

Once the network 4 has established the identity data for the recipient system 2, an initiation request 10 is sent by the originating system 3 to the recipient system 2.

Upon receipt of the initiation request 10, a check is performed at the recipient system 2 to establish whether originator generated call notification is supported and enabled in step 20.

Detection that the call supports originator generated call notification may be achieved by looking up the identity of the originator or of the session against a list or database, which can be stored on the recipient system, or any remote device.

If originator generated call notification is supported and enabled, data from the initiation request is used by the recipient system 2 to obtain data required to generate the call notification in step 30.

Once the data is obtained by the recipient system 2 in step 40, a call notification is generated and output by the recipient system 2 in step 50.

When the recipient 2 accepts the call, the call notification ends and the communication phase 60 starts.

As an alternative to the recipient system 2 doing a self-check to determine whether originator generated call notification is supported, the recipient system 2 may instead register acceptance with an entity within the network 4 which is checked prior to delivery of the initiation request 10 to the recipient system 2. If the entity does not have a registration of acceptance for an identified recipient system 2, a standard initiation request is instead transmitted to the recipient system 2 resulting in triggering the recipient system's standard call notification instead of an originator generated one.

Figure 3:
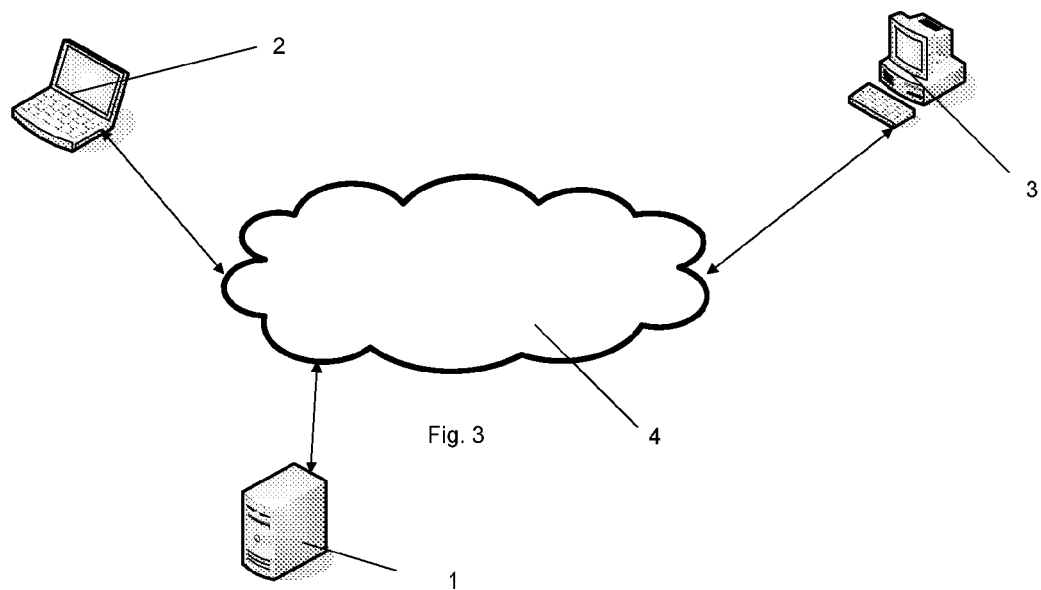
FIG. 3 is a schematic diagram of a communications system incorporating an embodiment of the present invention.

In one embodiment, as is illustrated in FIG. 3, a remote repository in the form of a server 1 may be arranged to store data and optionally notification attributes for originating systems 3. In such embodiments, the recipient system 2 may be triggered to communicate with the server in step 40 to obtain the data and any attribute settings for the originating system 3. The identity of the originating system 3 may be obtained from a CLI or similar identifier within the initiation request. An identifier, IP or web address of the server 1 may also be included in the initiation request.

The server 1 preferably includes an interface enabling the user of the originating system 3 to register himself or herself, store or select the data to be used for call notifications and set any notification attributes.

The initiation request may contain special information to be used by the originating system to identify calls that support originator generated call notification. For regular telephony this may be an extension to the caller-line ID, for SIP it may be a special code in the subject line, with similar approaches for other session initiation mechanisms.

The server 1 may be part of a network proxy or a router. Instead of (or in addition to) uploading or selecting data far in advance of a call, the originating system 3 may upload or data to the server 1 or provide the server 1 an indication of data to be used for a call notification prior to, or during, the initiation phase.

In an alternative embodiment, the recipient system 2 may obtain the data and optionally any notification attributes directly from the originating system 3. This may be through a peer-to-peer connection, or any other form of connection.

Embodiments of the present invention may deal with the recipient system obtaining call notification data in different ways and/or at different times. Various exemplary embodiments are discussed below although other variations are possible.

Figure 4:
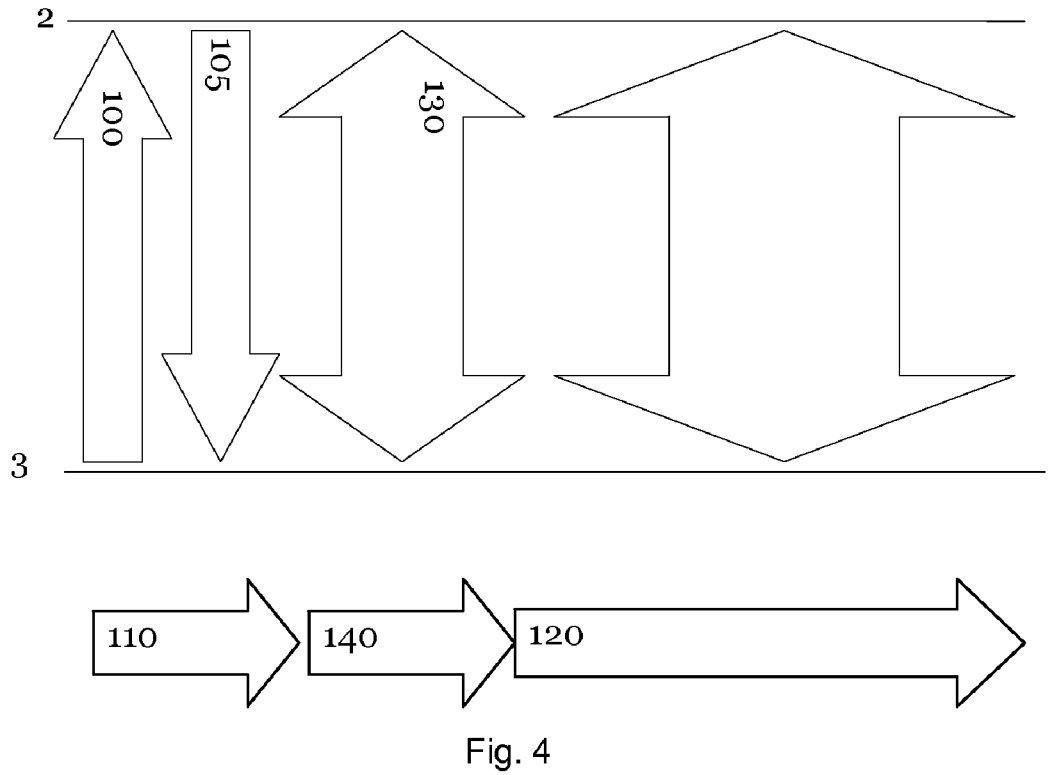

In one embodiment illustrated in FIG. 4, the recipient system receives notification that call notification data is available and accesses it during the standard initiation phase 110 before the communication phase commences 120.

The initiation phase 110 is extended to ensure that the communication phase 120 does not begin until the call notification data is received, and, where relevant, is output or processed by the recipient system 2.

Notification that the originating system 3 has call notification data accessible to the recipient system 2 by peer-to-peer communication is contained within the initiation handshake 100. After the initiation handshake ends at step 105, but before the communication phase 120 begins, the call notification data is sent in step 130 from the originating system 3 to the recipient system 2. This is termed an "extended initiation phase" 140 and is differentiated from the communication phase 120 in that full synchronous communication between users is not permitted during this phase, only the transfer of call notification data for the call notification.

Figure 5:
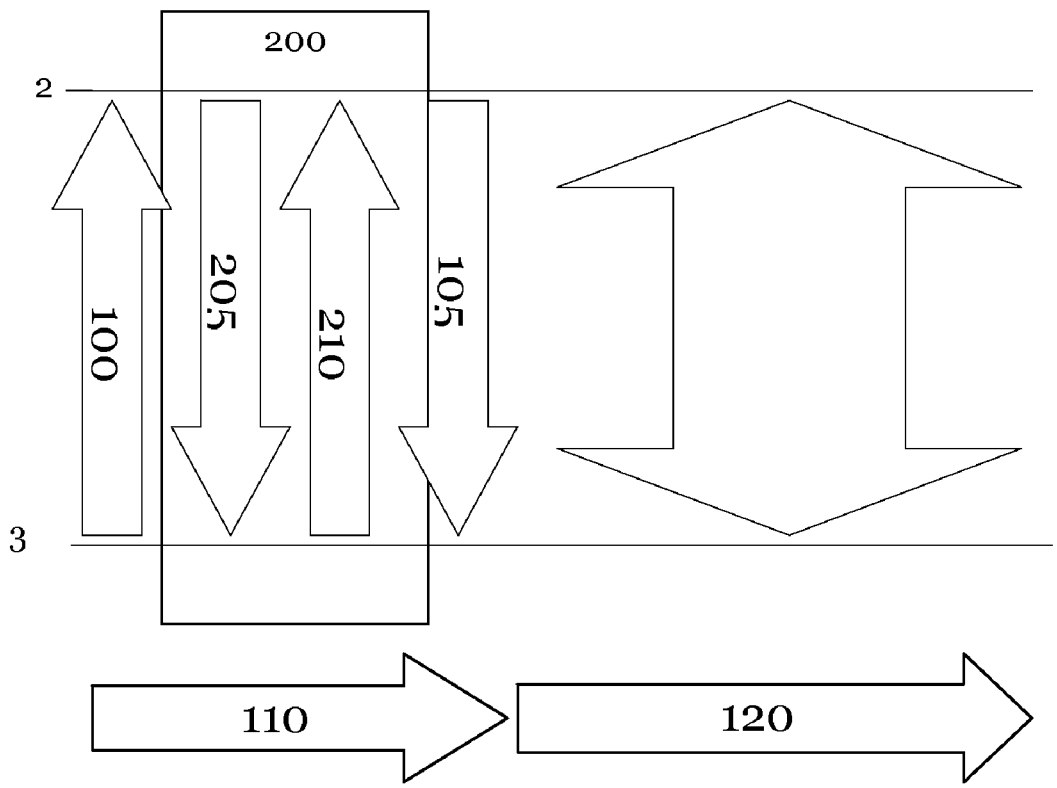

As an alternative to an "extended initiation phase", in the embodiment of FIG. 5, a separate communications session 200 is established between the two devices. The recipient system 2 requests in step 205 for the transfer of the call notification data, which is then transmitted in step 210 by the originating system 3. Only once this is completed and the call notification presented to the user, do the systems consider the initiation handshake 100 completed and allow the communication phase 120 to begin.

In the embodiment of FIG. 6, the originating system 3 notifies a server 1 as part of a separate communications session 250 that call notification data is available. The usual initiation handshake 100 is then initiated by the originating system 3, and the recipient system 2 creates a further separate communications session 260 to check with the server 1 whether call notification data is available.

On establishing that call notification data is available, the recipient system 2 closes the initiating handshake in step 105 and opens a communications session 270 with the originating system 3 but does not allow the communications phase to start. During this phase 280, call notification data is transferred from the originating system 3 to the recipient system 2. This phase 280 only ends when the receiver accepts the call at which time the communication phase 120 starts.

As illustrated in the embodiments of FIG. 7, the recipient system 2 may uses the current session to request the call notification data from the originating system 3 instead of starting a new one.

In the embodiment illustrated in FIG. 8, once the initiation handshake 100 has passed from the originating system 3 to the recipient system 2, the originating system 3 opens a separate communication session 300 and registers in step 310 that call notification data is available on a separate server 1. The recipient system 2 similarly opens a separate communication session upon receipt of the handshake 100 and checks in step 320 whether call notification data is available. On establishing that call notification data is available, the recipient system 2 closes the initiating handshake 100 and opens a communications session 330 with the originating system 3 but does not allow the communication phase to start. An extended initiation phase 340 then takes place in which the call notification data is transferred from the originating system 3 to the recipient system 2. This phase 340 only ends when the recipient accepts the call, at which point the communication phase 120 starts.

In another embodiment illustrated in FIG. 9, the initiation phase 110 starts once the initiation handshake 100 has passed from the originating system 3 to the recipient system 2. The originating system 3 opens a separate communication session 400 and registers that call notification data is available on a separate server 1. The recipient system 2 similarly opens a separate communication session upon receipt of the handshake 100 and checks in step 410 whether call notification data is available. On establishing that call notification data is available the recipient system 2 uses the current session to request the call notification data from the originating system 3 in step 420. In step 430, the originating system 3 then transmits this data to the recipient system 2 which outputs the call notification. Once the recipient 2 accepts the call, the handshake 100 is completed, and the communication phase 120 starts.

In the embodiment of FIG. 10, the initiation phase 110 starts once the initiation handshake 100 has passed from the originating system 3 to the recipient system 2. The originating system 3 opens a separate communication session 400 and uploads call notification data to a separate server 1 in step 510. The recipient system 2 similarly opens a separate communication session and in step 520 requests appropriate call notification data from the server 1. If call notification data is available, it is downloaded in step 530 from the server to the recipient system 2 which then outputs the call notification. Once the receiver accepts the call, the handshake 100 is completed, and the communication phase 120 is allowed to start.

FIG. 11 illustrates an alternative to the embodiment illustrated in FIG. 10, in which the upload of data 510 occurs before the session initiation handshake 100.

In one embodiment, the upload 510 of the data to a server and notification 515 to the server of the presence of call notification data may optionally be performed separately, respectively before and after the initiation handshake 100, as is illustrated in FIG. 12.

In the case of a mobile telephone implementation, the originating mobile telephone transmits an originator controlled call notification trigger to the recipient mobile telephone during call set-up. The recipient mobile telephone processes the trigger and is caused to obtain call notification data to generate a call notification for output to the recipient user before they decide whether to take the call.

The call notification data can include a number of different data types, including an originator-defined ring tone, a originator-recorded ring tone, a priority flag, a textual message, a picture, etc. The call notification data is typically selected created or provided by the originator and is made available for download and subsequent use by the recipient mobile telephone before the recipient decides whether to accept the call.

At the originator mobile telephone, the originating user is able to define the information to be transmitted, the identity of the recipient, and initiate the call with a network carrier.

The originating user is preferably able to set an additional preference within their phone's default parameters. When this preference is enabled, all calls which are made from the phone link a pre-defined originator controlled call notification to the call and cause the originator generated call notification at compatible recipient mobile telephones upon receipt of a call. A default originator controlled call notification is likely to include a user-specific item such as a picture or a ring tone rather than a call-specific item such as a message or a priority flag.

Alternatively or in addition, the user preferably can specify a call-specific originator controlled call notification to be linked to a call before it is made. This could be done by selecting an alternate call button or a combination of keys. In each case, the user will have to select the relevant call notification content before the call is made.

In the case of both call-specific information and user-specific information, the process of making the call once the originator controlled call notification has been linked to the call is identical to existing calling functions. Once the call is dialled, the originator hears a ringing tone or ring back tone, if configured, until the recipient answers the call. The originator may optionally be provided with some indication of whether the additional information has been received by the recipient or not.

The originator controlled call notification may be selected from a pre-defined list of call notifications or call notification types that is either pre-installed on the mobile telephone in the case of priorities, emoticons, and suchlike or more likely hosted on a server separate from the mobile telephone for ring tones, pictures etc.

The originator may optionally generate personal information that can be transmitted to the recipient before the call notification is generated by the recipient mobile telephone. This can include short textual messages (albeit different to an SMS message) photos, ring-tones, videos, or even self recorded sounds or video.

Preferably, where only limited bandwidth is available to the originating or recipient system, the originating system or the network may scale down the data to be downloaded by the recipient system for generating the call notification. This may be in the form of cached local copies of data, resolution decreased photos or video, down-sampled audio or the like.

Preferably, it should not be possible for an originator to send a call with an originator controlled call notification if they choose to suppress or withhold their phone number from the recipient.

The recipient can preferably configure whether their mobile telephone to accept or reject originator controlled call notifications. As most mobile telephones allow multiple profiles, it is preferable that profiles are made aware of originator controlled call notifications and include settings to allow certain originator controlled call notifications to override the profile settings. For example, a standard ring tone may be played during the "quiet" profile if the originator controlled call notification contains the "high priority" tag.

On receipt of a call setup handshake defining an originator controlled call notification, the recipient mobile telephone checks its current configuration to establish whether the originator controlled call notification can be presented to the user. If so, the mobile telephone obtains the necessary notification data and outputs the call notification to the user. The recipient mobile telephone may also send notification to the network carrier that the call notification has been successfully received and output. In the case of sounds, this should be a substitute for the standard ring tone.

Once the user accepts or rejects the call, the call notification is no longer output. If the call notification includes streamed data such as a ring tone or video then the remainder of the information is not transmitted to the recipient.

Preferably, the recipient mobile telephone includes an option enabling the recipient to save aspects of the call notification. Simple aspects of a call notification such as priority flags, short textual messages, and pictures may be stored in the recipient mobile telephone's memory and displayed in the call history. Larger forms of data may be stored on request of the recipient, possibly upon payment of a fee to the service provider or network carrier. Mobile telephones may be altered to enable all forms of call notification data to be stored locally and be accessible in the call history.

Preferably, a recipient mobile telephone already dealing with a call should be provided with as much of an originator controlled call notification as possible. What is technically possible in terms of call waiting will vary from network to network. Preferably, at least priority flags, short messages and pictures are provided to a recipient mobile telephone dealing with an existing call.

To avoid abuse of call notifications by people for nuisance calls (for example sending inappropriate or threatening additional information), a user should have the ability to blacklist certain originators so as to never receive additional information from that originator again.

It will be appreciated that there are many potential applications in which embodiments of the present invention may be utilised.

One potential application is the use of embodiments of the present invention in advertising. A call notification may include an advertisement or offer. To accept the offer or discuss the advertised product or service further with a human operator or automated system, the user of the recipient system merely needs to accept the call. This will connect him or her to the relevant person or system.

If the user is not interested, he or she merely needs to ignore the notification. For example, a user may elect to receive notifications of mobile phone ring-tones or wallpapers that are being offered for sale. The notification may include a sample of one or more ring-tones or wallpaper for preview by the user (for example these may be presented singularly or as a slideshow or similar). If the user wishes to purchase a particular ring-tone or wallpaper, he or she answers the call and is put through to a human or automated sales representative to progress the purchase.

In a similar manner, down-sampled or shortened versions of music tracks, videos and the like could also be sent as notifications allowing a user to preview content and purchase by accepting the call.

Figure 13:
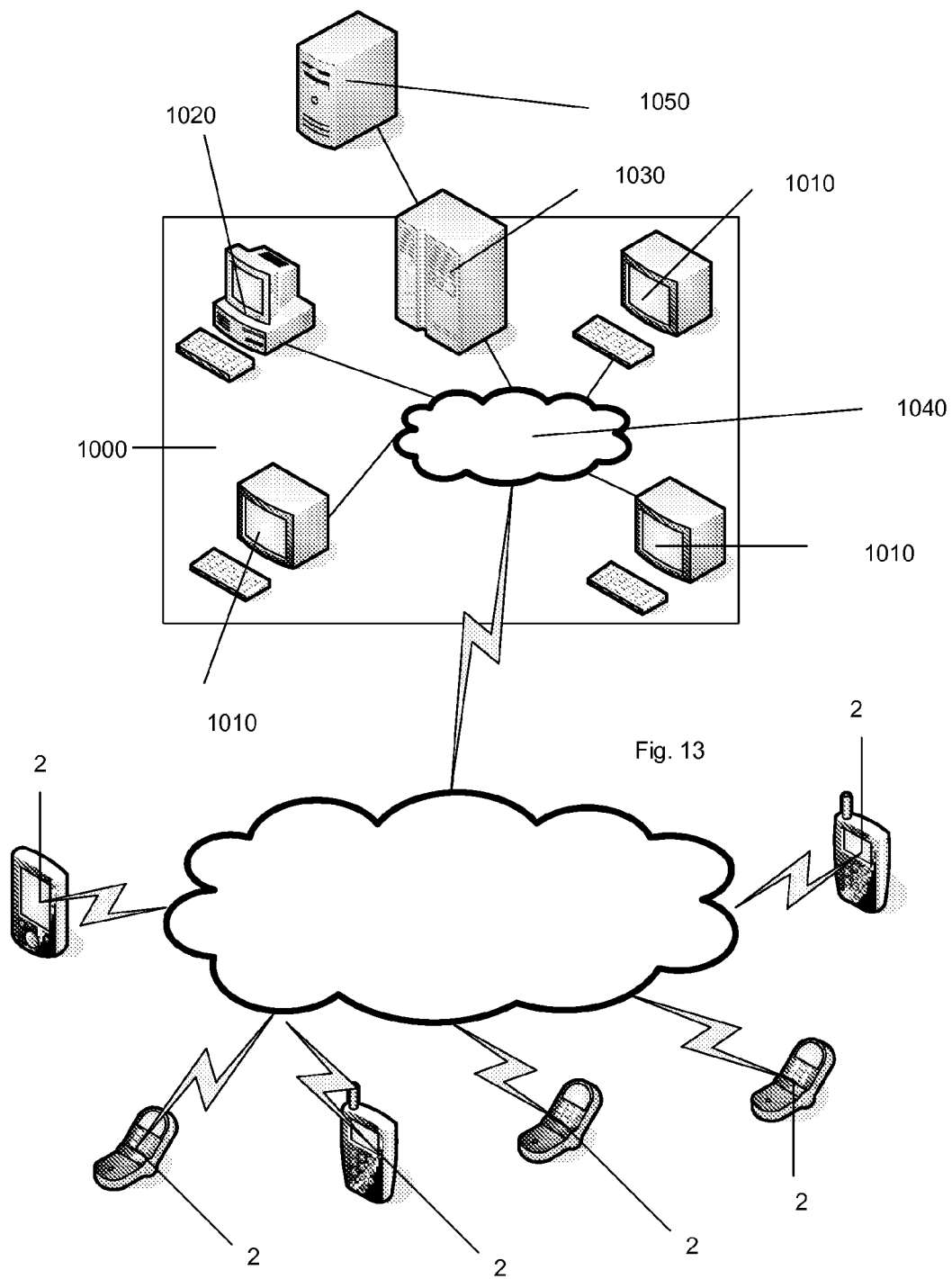

An application of one embodiment of the present invention is illustrated in FIG. 13. In the illustrated application, a call centre environment uses an embodiment of the present invention for tele-sales.

A call centre 1000 includes a number of operator terminals 1010, a centre manager terminal 1020 and a notification server 1030 interlinked via a data network 1040. The notification server 1030 is arranged to access a database 1050 holding data on recipient systems 2 that have elected to receive tele-sales offers.

The centre manager terminal 1020 is arranged to communicate with the operator terminals 1010 and the notification server 1030 to obtain utilisation data on the call centre 1000. Via the centre manager terminal 1020, the notification server 1030 can be triggered to send out call notifications to a predetermined number of recipient systems 2. Each call notification includes details on a tele-sales offer. Upon receipt at a recipient system 1100, the notification is output to the user in one of the ways discussed above (for example as one of, or a combination of, a graphic, a video or a sound file). Should the user of the recipient system 2 accept the call, the notification server is arranged to connect the call to an available operator terminal 1010.

In this manner, call centre capacity can be managed by the call centre manager terminal and the number of notifications issued can be balanced to the number of operator terminals 1010 in operation. In contrast to direct mail marketing and SMS based marketing, notifications can be controlled such that:
- a user will only be presented with the opportunity to accept the offer (the notification) during the operating hours of the call centre;
- volume limited offers (such as airplane seats, holidays etc) can be matched to an appropriate number of recipients so that offers are not over-subscribed; and,
- traditional businesses can operate cut down versions of the above system to provide "just-in-time" offers based on immediate availability (such as tables at a restaurant).

Optionally, a user may be provided the ability to register a preference profile in which only certain types of advertisements can be accepted/rejected. A system may also or alternatively be provided that monitors the type of advertisements accepted and tailors subsequent advertisements accordingly.

Other event-driven applications can be envisaged.

For example, a hotel may link its alarm call facility with its room service facilities. In this instance, the notification would be pre-arranged the night before and serve as the alarm call. If the user decides to get up then he or she can answer the call notification and be connected to room service to order his or her breakfast. Alternatively, if he or she decides to lie in, the system can be arranged to issue a further notification after a predetermined time period. In this manner, the user can decide when to wake yet still receive a warm/fresh breakfast.

In a similar scenario, for commuters and the like an alarm call could be provided to subscribing recipient systems 2 by a travel information company. If the alarm call is accepted, travel information matching a user's location or pre-set profile could be provided at a predetermined charging rate.

Figure 14:
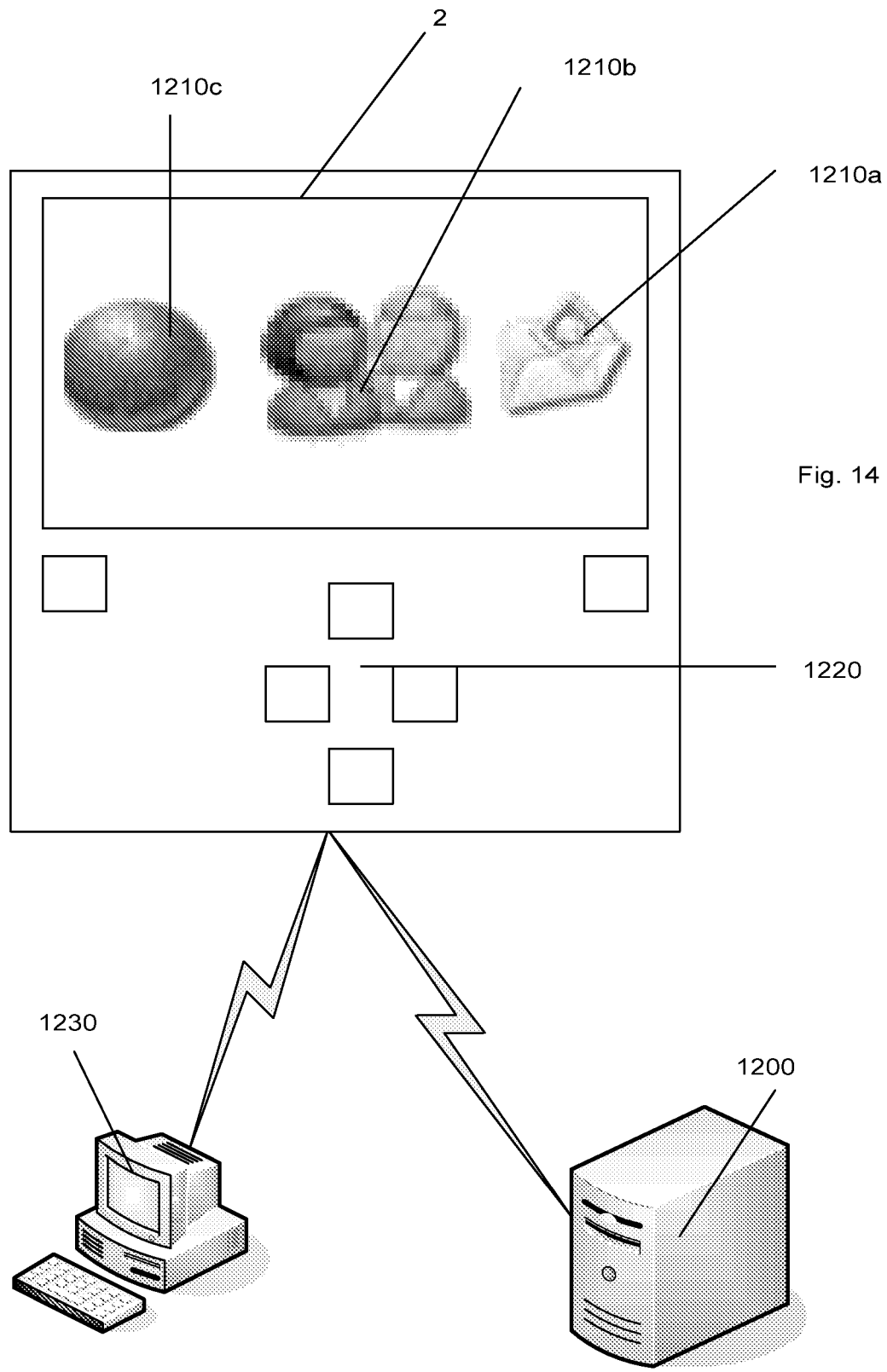

Another example is illustrated in FIG. 14. In this example, a search facility is offered to users of recipient systems 2.

Via a user interface on the recipient system 2, the user inputs appropriate keywords which are processed via a remote search engine 1200. The search engine 1200 searches a database of subscribed suppliers for matches with the keywords. Advertisements for suppliers matching the keywords are combined into a notification which is then sent to the recipient system 2. Upon receipt of the notification, the recipient system 2 outputs the notification as a slide-show 1210 of advertisements that can be navigated by the user via appropriate keys 1220 on the recipient system 2. Upon selection of an advertisement, the user presses a call key on the recipient system 2 which triggers a call (should they be available) or a call-back request otherwise with the respective supplier 1230.

Location based applications can also be envisaged based on a detected location of a recipient system 2. Detection could be determined via GPS like systems, cell based location detection or other such technologies. For example, a dating agency could offer a subscription based service using an embodiment of the present invention. In such an application, whenever a subscriber matching a user's pre-agreed profile comes within a predetermined range of the user's mobile telephone, a notification containing details, a photo or the like of the matching subscriber could be sent to the user's mobile telephone. Should the user be interested based on the information sent in the notification, he or she can elect to receive the call and be connected to the matching subscriber. Note in this instance, neither user decided to initiate the call notification. Depending on the configuration of the system, in instances where a third party initiates a call notification between two other parties, it may be appropriate for both parties to receive call notifications concerning the other party and make acceptance by both parties a pre-condition to putting the call through to the communication phase.

Particularly in the case of sales-based call notifications (although other call notifications may also apply), it may be appropriate for the notification to persist for a predetermined amount of time on the recipient system 2 should the notification not be immediately accepted. Persisting call notifications may include a number of pre-programmed phases in which the notification itself differs.

For example, upon receipt, the call notification may call for an audio prompt and an image or video to be output by the recipient system 2 (assuming the recipient system 2 is in an appropriate mode to do so and such notification types are not currently prohibited at the recipient system). Should the notification not be accepted within a predetermined time period (for example 10 seconds), it may enter a second phase in which the image or video may be output without any sound. Should the notification not be accepted within another predetermined time period then it may be removed from the recipient system's screen and recorded within a recent notifications list. After a predetermined time, the notification may be expired and either deleted from the recipient system 2 or configured in such a way that acceptance of the call is no longer possible.

Preferably, each recipient system 2 includes a key enabling a received notification to be rejected, in which case the notification is stopped and deleted from the recipient system 2.

Optionally, a notification may be arranged to control the recipient system 2 prevent a user at the recipient system 2 from accepting the call until the whole of the notification, or at least a predetermined part, has been output on the recipient system. In this manner, a user can be prevented from skipping important information such as terms and conditions that the originator may be legally bound to notify the recipient of. As discussed above, the notification can be rejected at any time.

Feedback data could optionally be provided to the originating system 3 to enable the originator to monitor the status of a notification. For example, different ring-tones may be used to indicate where a notification is being prepared and transmitted to the recipient system 2. The standard network ring-tone would typically be used to indicate to the originator that the notification is being output at the recipient system 2.

For capacity reasons, the communication channel being established by the call notification is only likely to be held open during the initial phase of a notification. If it is not accepted during that period, the communication channel is likely to be recycled. In such a situation, should a notification be accepted where there is no longer an associated communications channel, the recipient system 2 may be configured to call the originating system 3 or alternatively request a call-back.

In yet another embodiment, an RFID tag may be incorporated into the recipient system 2. When the tag passes within range of an RFID tag reader, a call notification can be initiated to the recipient system. The RFID tag may include an identifier for the recipient system or even the recipient's mobile telephone (preferably encoded to avoid abuse) to enable the RFID tag reader to identify the recipient system 2. One application of such an arrangement would be to embed or associate the tag reader with an advertisement. In this manner, a user detected to have spent a predetermined amount of time in front of an advertisement could be sent a call notification with a version of the advertisement that could be followed up with a call to obtain more information, book tickets, etc. Alternatively, the notification could include an offer associated with whatever is being advertised.

Various charging structures can be envisaged. For example, free calls may be offered to users that elect to receive advertisement based notifications. Alternatively, a user may be paid or otherwise rewarded for receiving advertisement call notifications. In yet another variation, notification capabilities may be provided free or a reduced charge if the originator/recipient allows advertising to be displayed before or after the notification or for banners to be included within the notification. For business users such as call centres, a bulk rate for notifications could be arranged with a preferential rate for the subsequent calls. Depending on the application, a recipient may or may not be charged to take a call following a notification. In the case of privately initiated call notifications and advertising calls, the recipient would not normally be charged. In the case of informational products and services provided via the call, the recipient would normally be charged.

Sponsored content can also be envisaged. For example, advertising bearing daily travel or weather information could be provided to subscribers with an option to call the advertiser to accept whatever product or service is offered. Charges to the recipient would be reduced or waived in such cases due to advertising revenues.

Preferably, the carrier must perform certain activities on originator generated or submitted notification data before use in a notification to ensure that it is technically valid and does not contain harmful software, such as viruses.

During a call initiation phase, the carrier receives an Identifier for the recipient of the call and an indication or link to an originator controlled call notification. The carrier establishes that the recipient system exists on the local network and checks to ensure that the recipient is registered to use the service.

Provided the recipient is registered to use the service, the carrier routes the call to the appropriate called ID on the network and supplies the recipient with both the calling ID and the indication or link to the originator controlled call notification. If the recipient accepts the call, then the carrier opens a call between the originator and the recipient.

In the case of a recipient based on a foreign (non-local) network, once the carrier has established that the recipient exists on a foreign network, it may check to ensure that the foreign network supports originator controlled call notification. Depending on the implementation and agreements between carriers, any necessary notification data may be transferred from a server or resource on the originator's network to one on the foreign network to simplify access by the recipient.

Controls may be put in place to prevent originator controlled call notifications when the originator or recipient is on a roaming network or abroad. Originator controlled call notifications may attract a charge in addition to that of the call to the originator or recipient or both. In the case of mobile telephones, service contracts that include a number of free originator controlled call notifications can be envisaged in the same way as such contracts currently provide free calling minutes or SMS messages. The charge may be dependent on the call notification itself (for example the amount of call notification data transmitted to the recipient). A charge may also be placed on use of originator controlled call notifications, irrespective of the amount of call notification data it contains to prevent free communication use of originator controlled call notifications without the recipient answering calls. Billing may be undertaken by the existing network carrier billing system, most likely by producing additional CDR call data records for post-pay customers.

Diverted calls are handled in exactly the same way as normal calls, with the full check on foreign or local networks and on user provisioning for the receipt of additional information Practical considerations in many mobile networks may mean that the service will have to be disabled for diverted calls but this will vary from network to network.

Whilst standards are continually converging and systems expanding to enable them to support different data formats, it is quite likely that the format of some data types will need to be changed to be suitable for output by a recipient system. For example, music, pictures, or video encoding formats may need to be changed to a format (and/or size) suitable for the recipient system. Embodiments of the present invention include a transcoding system through which call notification data is proxied before being transmitted to the recipient.

The various embodiments described above disclose features that can optionally be combined in a variety of ways depending on the desired implementation. Since the features described are modular, other embodiments based on different combinations of features are also possible.

None of the described features are mutually exclusive, and any combination of may be deployed to achieve the functions described above.

The invention claimed is:

1. A call notification system arranged to handle calls and, in respect of each call, to generate a call notification at a recipient system in response to receipt of initiation data on the call from an originating system, the initiation data being arranged to trigger the recipient system to open a separate peer-to-peer connection to the originating system to obtain the call notification data from the originating system for use in generating the call notification whereby at least aspects of the call notification are controllable by the originating system, wherein the recipient system is arranged, prior to the establishment of the communication phase for the call, to selectively provide feedback data on the status of the call notification to the originating system, the feedback data including an indication to the originating system of receipt of the call notification data by the recipient system for a first portion of said calls in which the recipient system received the call notification data, and an indication to the originating system of non-receipt of the call notification data by the recipient system for a second portion of said calls in which the recipient system did not receive the call notification data.

2. The call notification system according to claim 1, wherein the originating system is one of:
a mobile telephone, an application running on a computer, an IP telephony client, a fixed line telephone, a video phone, or a teleconferencing system.

3. The call notification system according to claim 1, wherein the recipient system is one of:
a mobile telephone, an application running on a computer, an IP telephony client, a fixed line telephone, a video phone, or a teleconferencing system.

4. The call notification system according to claim 1, wherein the initiation data includes one or more of: call notification data, encoded call notification data, a link to call notification data or a unique identifier referencing call data stored at a predetermined location, the recipient system being arranged to generate the call notification in dependence on the call notification data.

5. The call notification system according to claim 1, wherein the call notification data includes one or more of:
a ringtone, a link to call notification data, a definition of the call notification to be generated at the recipient system, an image, contact data, instructions on an action to be taken by the recipient system, a reference to a source from which data must be obtained, instructions on how to generate at least aspects of the call notification, or data requiring encoding, decoding, translating or rendering by the recipient system prior to output.

6. The call notification system according to claim 1, wherein the recipient system is arranged to store at least aspects of the call notification on demand.

7. The call notification system according to claim 1, wherein the feedback data includes a ringtone indicating the status of the recipient system with respect to the notification.

8. The call notification system according to claim 7, wherein different ringtones indicate each of a plurality of different statuses of the recipient system with respect to the notification.

9. The system of claim 1, wherein feedback data on the status of the call notification is provided to the originating system using the separate peer-to-peer connection.

10. A method of generating call notifications for each of a plurality of calls, the method comprising for each of the plurality of calls:
receiving initiation data on the call from an originating system at a recipient system;
opening a separate peer-to-peer connection from the recipient system to the originating system;
obtaining the call notification data from the originating system;
selectively providing, prior to the establishment of the communication phase for the call, feedback data on the status of the call notification to the originating system; and,
generating a call notification at the recipient system in dependence on the obtained call notification data,
wherein at least aspects of the call notification are predetermined by the originating system
wherein for a first portion of said plurality of calls in which the call notification is received by the recipient system the step of providing feedback data includes providing an indication to the originating system of the call of receipt of the call notification data by the recipient system, and for a second portion of said plurality of calls in which the recipient data is not received by the recipient system the step of providing feedback data includes providing an indication to the originating system of the call of non-receipt of the call notification data.

11. The method according to claim 10, further comprising obtaining call notification data at the recipient system for use in generating the call notification.

12. The method according to claim 10, wherein the call notification data includes one or more of:
a ringtone, a link to call notification data, a definition of call notification data to be generated at the recipient system, an image, contact data, instructions on an action to be taken by the recipient system, a reference to a source from which data must be obtained, instructions on how to generate at least aspects of the call notification, or data requiring encoding, decoding, translating or rendering by the recipient system prior to output.

13. The method according to claim 10, further comprising storing at least aspects of the call notification on demand at the recipient system.

14. The method according to claim 10, wherein the step of providing feedback data includes outputting a ringtone to the originating system indicating the status of the recipient system with respect to the notification.

15. The method according to claim 14, wherein the step of outputting includes outputting one of a plurality of different ringtones in dependence the status of the recipient system with respect to the notification.

16. The method of claim 10, wherein feedback data on the status of the call notification is provided to the originating system using the separate peer-to-peer connection.

17. A call notification system comprising:
an originating system at which a call is originated, the originating system having call notification data for use in generating a call notification and being configured to initiate the call and provide the call notification data;
a recipient system at which the call is received, the recipient system being configured to, in response to receipt of initiation data on the call and prior to the establishment of the communication phase for the call:

open a separate peer-to-peer connection to the originating system to obtain the call notification data from the originating system for use in generating the call notification;

generate the call notification;

selectively provide feedback data on a status of the call notification to the originating system, the feedback data including at least an indication to the originating system of non-receipt of the call notification data by the recipient system for the call in which the recipient system did not receive the call notification data; and have at least aspects of the call notification at the recipient system controllable by the originating system.

18. The call notification system according to claim 17, wherein the originating system is one of:

a mobile telephone, an application running on a computer, an IP telephony client, a fixed line telephone, a video phone, or a teleconferencing system.

19. The call notification system according to claim 17, wherein the recipient system is one of:

a mobile telephone, an application running on a computer, an IP telephony client, a fixed line telephone, a video phone, or a teleconferencing system.

20. The call notification system according to claim 17, wherein the initiation data includes one or more of: call notification data, encoded call notification data, a link to call notification data or a unique identifier referencing call data stored at a predetermined location, the recipient system being arranged to generate the call notification in dependence on the call notification data.

21. The call notification system according to claim 17, wherein the call notification data includes one or more of:

a ringtone, a link to call notification data, a definition of the call notification to be generated at the recipient system, an image, contact data, instructions on an action to be taken by the recipient system, a reference to a source from which data must be obtained, instructions on how to generate at least aspects of the call notification, or data requiring encoding, decoding, translating or rendering by the recipient system prior to output.

22. The call notification system according to claim 17, wherein the recipient system is arranged to store at least aspects of the call notification on demand.

23. The call notification system according to claim 17, wherein the feedback data includes a ringtone indicating the status of the recipient system with respect to the notification.

24. The call notification system according to claim 23, wherein different ringtones indicate each of a plurality of different statuses of the recipient system with respect to the notification.

25. The system of claim 17, wherein the aspects of the call notification are controllable by the originating system using the separate peer-to-peer connection.

* * * * *